United States Patent [19]

Koo et al.

[11] Patent Number: 6,063,278
[45] Date of Patent: May 16, 2000

[54] COMPOSITE POLYAMIDE REVERSE OSMOSIS MEMBRANE AND METHOD OF PRODUCING THE SAME

[75] Inventors: Ja-Young Koo, Acton, Mass.; Young Seo Yoon, Seoul, Rep. of Korea

[73] Assignee: Saehan Industries Inc., Rep. of Korea

[21] Appl. No.: 09/067,891

[22] Filed: Apr. 28, 1998

[51] Int. Cl.⁷ .......................... B01D 39/14; B29C 65/02
[52] U.S. Cl. ................ 210/500.38; 210/500.37; 210/500.39; 210/490; 264/41; 427/244; 427/245
[58] Field of Search ............... 210/500.37, 500.38, 210/490, 500.39; 264/41; 427/244, 245

[56] References Cited

U.S. PATENT DOCUMENTS

| | | |
|---|---|---|
| 4,277,344 | 7/1981 | Cadotte . |
| 4,761,234 | 8/1988 | Uemura et al. . |
| 4,769,148 | 9/1988 | Fibiger et al. . |
| 4,830,885 | 5/1989 | Tran et al. ............................ 427/245 |
| 4,872,984 | 10/1989 | Tomaschke . |
| 4,950,404 | 8/1990 | Chau . |
| 4,980,067 | 12/1990 | Hou et al. ............................ 210/638 |
| 4,983,291 | 1/1991 | Chau et al. . |
| 5,576,057 | 11/1996 | Hirose et al. . |
| 5,614,099 | 3/1997 | Hirose et al. . |
| 5,746,917 | 5/1998 | Altmeier ............................ 210/500.37 |

*Primary Examiner*—W. L. Walker
*Assistant Examiner*—Terry K. Cecil
*Attorney, Agent, or Firm*—Kriegsman & Kriegsman

[57] ABSTRACT

A composite polyamide reverse osmosis membrane and method of producing same. In one embodiment, the membrane is made by coating a porous polysulfone support for about 40 seconds with an aqueous solution containing 2 wt % of meta-phenylenediamine (MPD), 1 wt % 1,4-diazabicyclo[2,2,2]octane (DABCO) and 0.85 wt % methanesulfonic acid (MSA). Next, the excess MPD solution is removed, and the coated support is dipped for about 1 minute in 0.1 wt % organic solvent solution of trimesoyl chloride (TMC) in a mixture of alkanes having from 8 to 12 carbon atoms. After draining the TMC solution off, the resulting composite membrane is heated at 90° C. for about 3.5 minutes and then rinsed in a basic aqueous solution at 40–60° C. for 30 minutes. The resultant membrane exhibits a flux of 32.3 gfd and a salt rejection of 97.0% when used at 225 psi for an aqueous solution containing 2000 ppm of NaCl.

58 Claims, No Drawings

COMPOSITE POLYAMIDE REVERSE OSMOSIS MEMBRANE AND METHOD OF PRODUCING THE SAME

BACKGROUND OF THE INVENTION

The present invention relates generally to reverse osmosis membranes and more particularly to a novel composite polyamide reverse osmosis membrane and to a method of producing the same.

It is known that dissolved substances can be separated from their solvents by the use of various types of selective membranes, examples of such membranes including microfiltration membranes, ultrafiltration membranes and reverse osmosis membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. More preferably, the flux for the membrane is at least about 22 gfd at brackish water conditions. For certain applications, a rejection rate that is less than that which would otherwise be desirable may be acceptable in exchange for higher flux and vice versa.

One common type of reverse osmosis membrane is a composite membrane comprising a porous support and a thin polyamide film formed on the porous support. Typically, the polyamide film is formed by an interfacial polymerization of a polyfunctional amine and a polyfunctional acyl halide.

An example of the aforementioned composite reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) an amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b) so as to form a water permeable membrane.

The amine salt of Tomaschke is said to be monomeric (i.e., polymerizable) and is said preferably to be a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; and N,N-dialkylamine, such as N,N-dimethylethylamine and N,N-diethylmethylamine; an N,N-dialkyl ethanolamine, such as N,N-dimethylethanolamine; a bicyclic tertiary amine, such as 3-quinuclidinol and mixtures thereof, or a quaternary amine selected from at least one member of the group consisting of a tetraalkylammonium hydroxide, such as tetramethylammonium hydroxide, tetraethylammonium hydroxide and tetrapropylammonium hydroxide; a benzyltrialkylammonium hydroxide, such as benzyltrimethylammonium hydroxide, benzyltriethylammonium hydroxide and benzyltripropylammonium hydroxide; and mixtures thereof.

The present inventors have noted that all of the amine salts disclosed by Tomaschke are the product of a strong acid and a monofunctional tertiary amine and that Tomaschke does not teach or suggest the use of a water soluble salt of a strong acid and a polyfunctional tertiary amine.

Other patents of interest include U.S. Pat. No. 5,614,099, inventors Hirose et al., which issued Mar. 25, 1997, U.S. Pat. No. 5,576,057, inventors Hirose et al., which issued Nov. 19, 1996, U.S. Pat. No. 4,983,291, inventors Chau et al., which issued Jan. 8, 1991, U.S. Pat. No. 4,761,234, inventors Uemura et al., which issued Aug. 2, 1988, and U.S. Pat. No. 4,769,148, inventors Fibiger et al., which issued Sep. 6, 1988, all of which are incorporated herein by reference.

SUMMARY OF THE INVENTION

It is an object of the present invention to provide a novel polyamide membrane.

According to one aspect of the present invention, there is disclosed a polyamide membrane, said polyamide membrane comprising a reaction product of (i) a polyfunctional amine and (ii) an amine-reactive reactant selected from the group consisting of a polyfunctional acyl halide, a polyfunctional sulfonyl halide and a polyfunctional isocyanate (iii) in the presence of a salt-containing compound, said salt-containing compound being a reaction product of a strong acid and a polyfunctional amine.

Preferably, said salt-containing compound is the reaction product of a strong acid and a polyfunctional tertiary amine, wherein said polyfunctional tertiary amine has n tertiary amine functional groups, n being greater than or equal to 2, and wherein said polyfunctional tertiary amine and said strong acid are reacted together in a molar ratio that is greater than or equal to 1:1, respectively, and is less than 1:n, respectively. More preferably, said molar ratio of said polyfunctional tertiary amine to said strong acid is greater than or equal to 1:1 and less than or equal to 1:(0.95)n and even more preferably is greater than or equal to 1:1 and less than or equal to 1:(0.9)n.

Still even more preferably, said salt-containing compound comprises at least one tertiary amine salt functional group (i.e., a protonated tertiary amine functional group) and at least one tertiary amine functional group (i.e., an un-protonated tertiary amine functional group).

Examples of said polyfunctional tertiary amine include 1,4-diazabicyclo[2,2,2]octane; 1,8-diazabicyclo[5,4,0]undec-7-ene; 1,5-diazabicyclo[4,3,0]non-5-ene; 1,4-dimethylpiperazine; 4-[2-(dimethylamino)ethyl]morpholine; N,N,N',N', -tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; N,N,N',N', N", -pentamethyldiethylenetriamine; and mixtures thereof. Examples of the strong acid include methanesulfonic acid, toluenesulfonic acid, camphorsulfonic acid, ethanesulfonic acid and benzenesulfonic acid, or any other aromatic, aliphatic, or cycloaliphatic sulfonic acid, trifluoroacetic acid, nitric acid, hydrochloric acid and sulfuric acid.

Preferably, the salt-containing compound is present in an aqueous solution together with the polyfunctional amine used in the interfacial polycondensation reaction with the amine-reactive reactant.

The present inventors have surprisingly discovered that polyamide membranes made in the presence of compounds comprising at least one tertiary amine salt functional group and at least one tertiary amine functional group possess unexpectedly better flux than do polyamide membranes made in the presence of certain compounds, such as those of Tomaschke, which comprise a single tertiary amine salt functional group and no tertiary amine functional groups. Without wishing to be limited to any particular theory behind the invention, the present inventors believe that one possible reason for the improved flux exhibited by polyamide membranes made in the presence of compounds comprising both at least one tertiary amine salt functional group and at least one tertiary amine functional group is that the tertiary amine functional group acts as a proton acceptor for acid by-products of the interfacial polymerization reaction between the polyfunctional amine and the amine-reactive reactant used to make the polyamide membrane. By contrast, compounds comprising a single tertiary amine salt functional group and no tertiary amine functional groups (such as those of Tomaschke) have no functional group capable of serving as a proton acceptor for the aforementioned acid by-products.

The present invention is also directed to a composite reverse osmosis membrane comprising a porous support and a polyamide membrane of the type broadly described above.

The present invention is further directed to a method of producing a composite reverse osmosis membrane of the type broadly described above.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

According to one aspect, the present invention is directed to a polyamide membrane, said polyamide membrane comprising a reaction product of (i) a polyfunctional amine and (ii) an amine-reactive reactant selected from the group consisting of a polyfunctional acyl halide, a polyfunctional sulfonyl halide and a polyfunctional isocyanate (iii) in the presence of a salt-containing compound, said salt-containing compound preferably being a reaction product of a strong acid and a polyfunctional amine.

The porous support of the present invention is typically a microporous support. The particular microporous support employed in the present invention is not critical thereto but is generally a polymeric material containing pore sizes which are of sufficient size to permit the passage of permeate therethrough but not large enough so as to interfere with the bridging over of the ultrathin membrane formed thereon. The pore size of the support will generally range from 1 to 300 nanometers inasmuch as pores which are larger in diameter than 300 nanometers will permit the ultrathin film to sag into the pores, thus disrupting the flat sheet configuration desired. Examples of microporous supports useful in the present invention include those made of a polysulfone, a polyether sulfone, a polyimide, a polyamide, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 $\mu$m, preferably about 40 to 75 $\mu$m.

The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxy group or a halogen atom. Additional examples of suitable polyamines include alkanediamines, such as 1,3-propanediamine and its homologs with or without N-alkyl or aryl substituents, cycloaliphatic primary diamines, such as cyclohexane diamine, cycloaliphatic secondary diamines, such as piperizine and its alkyl derivatives, aromatic secondary amines, such as N,N'-dimethyl-1,3-phenylenediamine, N,N'-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine.

The polyamine is present in an aqueous solution in an amount in the range of from about 0.1 to 20%, preferably 0.5 to 8%, by weight, of the aqueous solution. The pH of the aqueous solution is in the range of from about 7 to 10. The pH can be adjusted by the addition of a base; however, as will become apparent, this will not typically be necessary since the aqueous solution also contains a salt-containing compound, which typically has at least one amine group available to act as an acid acceptor.

As noted above, in addition to the aforementioned polyamine, the aqueous solution further comprises a salt-containing compound, the salt-containing compound preferably being a reaction product of a strong acid and a polyfunctional amine.

Preferably, said salt-containing compound is the reaction product of a strong acid and a polyfunctional tertiary amine, wherein said polyfunctional tertiary amine has n tertiary amine functional groups, n being greater than or equal to 2, and wherein said polyfunctional tertiary amine and said strong acid are reacted together in a molar ratio that is greater than or equal to 1:1, respectively, and is less than 1:n, respectively. More preferably, said molar ratio of said polyfunctional tertiary amine to said strong acid is greater than or equal to 1:1 and less than or equal to 1:(0.95)n and even more preferably is greater than or equal to 1:1 and less than or equal to 1:(0.9)n.

Still even more preferably, said salt-containing compound comprises at least one tertiary amine salt functional group and at least one tertiary amine functional group. In this manner, although not wishing to be limited to any particular theory behind the invention, the present inventors believe that the tertiary amine salt functional group is free to act as a pore former in the polyamide membrane to thus enhance flux whereas the tertiary amine functional group is free to act a proton acceptor for acid by-products produced during the interfacial reaction between the polyfunctional amine (e.g., meta-phenylenediamine) and the amine-reactive reactant (e.g., trimesoyl chloride). This bifunctional character of the salt-containing compound appears to improve flux surprisingly more than salt-containing compounds of the type having a single tertiary amine salt functional group and no tertiary amine functional groups or, as shown below, salt-containing compounds having two or more tertiary amine salt functional groups and no tertiary amine functional groups.

Examples of polyfunctional tertiary amines for use in the present invention include 1,4-diazabicyclo[2,2,2]octane (DABCO); 1,8-diazabicyclo[5,4,0]undec-7-ene (DBU); 1,5-diazabicyclo[4,3,0]non-5-ene (DBN); 1,4-dimethylpiperazine; 4-[2-(dimethylamino)ethyl] morpholine; N,N,N',N',-tetramethylethylenediamine; N,N,N',N',-tetramethyl-1,3-butanediamine (TMBD); N,N,N',N',-tetramethyl-1,4-butanediamine; N,N,N',N',-tetramethyl-1,3-propanediamine; N,N,N',N',-tetramethyl-1,6-hexanediamine (TMHD); 1,1,3,3-tetramethylguanidine (TMGU); N,N,N',N',N",-pentamethyldiethylenetriamine; and mixtures thereof.

Examples of strong acids for use in the present invention include methanesulfonic acid (MSA), toluenesulfonic acid (TSA), camphorsulfonic acid (CSA), ethanesulfonic acid (ESA), benzenesulfonic acid (BSA), and other aromatic, aliphatic, and cycloaliphatic sulfonic acids, trifluoroacetic acid, nitric acid, hydrochloric acid, sulfuric acid and mixtures thereof.

The salt-containing compound of the present invention is preferably present in the aqueous solution in an amount constituting about 0.1 to 12%, by weight, of said aqueous solution.

The amine-reactive reactant employed in the present invention is one or more compounds selected from the group consisting of a polyfunctional acyl halide, a polyfunctional sulfonyl halide and a polyfunctional isocyanate. Preferably, the amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other amine-reactive reactants are disclosed in the patents incorporated herein by reference.

The amine-reactive reactant is present in an organic solvent solution, the solvent for said organic solvent solution comprising any organic liquid immiscible with water. The amine-reactive reactant is present in the organic liquid in an amount in the range of from about 0.01 to 10%, preferably 0.01 to 0.5%, by weight, of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

In accordance with the method of the present invention, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried, preferably by heating at 50° C.–130° C. (preferably at about 90° C.) for about 5 seconds to about 20 minutes (preferably about 4 minutes), and then rinsed in a basic aqueous solution for about 1 to 30 minutes at a temperature between room temperature and about 95° C.

The following examples are provided for illustrative purposes only and are in no way intended to limit the scope of the present invention:

EXAMPLE 1

A 140 μm thick microporous polysulfone support including the backing non-woven fabric was soaked in an aqueous solution containing 2 wt % of meta-phenylenediamine (MPD), 1 wt % 1,4-diazabicyclo[2,2,2]octane (DABCO) and 0.85 wt % methanesulfonic acid (MSA) for 40 seconds. The support was drained and nip rolled to remove the excess aqueous solution. Then, the coated support was dipped in 0.1 wt % solution of trimesoyl chloride (TMC) in Isopar® solvent (Exxon Corp.) for 1 minute followed by draining the excess organic solution off the support. The resulting composite membrane was heated at 90° C. for about 3.5 minutes and then rinsed in 0.2% $Na_2CO_3$ aqueous solution at 40–60° C. for 30 minutes before performance test. The performance of the reverse osmosis membrane was measured by passing an aqueous solution containing 2000 ppm of NaCl through the membrane at 225 psi. The salt rejection was 97.0% and the flux was 32.3 gfd.

EXAMPLE 2

The same procedure as set forth in Example 1 was repeated, except that 2 wt % DABCO and 1.7 wt % MSA were used instead of 1 wt % DABCO and 0.85 wt % MSA. The salt rejection rate was 96.7% and the flux was 28.4 gfd under the same test conditions specified in Example 1.

EXAMPLES 3–25 and COMPARATIVE EXAMPLE A

The same procedure as set forth in Example 1 was carried out for each of Examples 3–25 and Comparative Example A, except that the polyfunctional tertiary amines and strong acids indicated in TABLE I were used instead of 1 wt % DABCO and 0.85 wt % MSA. The concentrations of the various polyfunctional tertiary amines and strong acids are shown in Table I.

functional tertiary amine to strong acid approaches 1:n, where n is the number of tertiary amine functional groups present in the polyfunctional tertiary amine, the flux of the polyamide membrane made in the presence thereof decreases significantly.

The embodiments of the present invention recited herein are intended to be merely exemplary and those skilled in the art will -be able to make numerous variations and modifications to it without departing from the spirit of the present invention. All such variations and modifications are intended to be within the scope of the present invention as defined by the claims appended hereto.

What is claimed is:

1. A polyamide membrane comprising a reaction product of (i) a polyfunctional amine and (ii) an amine-reactive reactant selected from the group consisting of a polyfunctional acyl halide, a polyfunctional sulfonyl halide and a polyfunctional isocyanate (iii) in the presence of a compound, said compound comprising at least one tertiary amine salt functional group and at least one tertiary amine functional group.

2. The polyamide membrane as claimed in claim 1 wherein said compound has no more than one tertiary amine salt functional group and no more than one tertiary amine functional group.

3. The polyamide membrane as claimed in claim 1 wherein said compound has at least two tertiary amine functional groups.

TABLE I

| EXAMPLE | AMINE/ACID | CONCENTRATION (wt %)/(mole ratio) | FLUX (GFD) | REJECTION (%) |
|---|---|---|---|---|
| 3 | DABCO/MSA | 1 and 1.7/(1:2) | 21.0 | 97.3 |
| 4 | DABCO/TSA | 1.2 and 2/(1:1) | 31.3 | 95.7 |
| 5 | DABCO/CSA | 2.2 and 4.5/(1:1) | 26.7 | 96.0 |
| 6 | DABCO/CSA | 1.1 and 4.5/(1:2) | 17.4 | 97.0 |
| 7 | DABCO/ESA (ESA in 70% aqueous solution) | 1 and 1.4/(1:1) | 24.5 | 97.0 |
| 8 | DBU/BSA | 1 and 1/(1:1) | 31.0 | 95.0 |
| 9 | DBU/MSA | 1 and 0.6/(1:1) | 29.4 | 95.1 |
| 10 | DBU/ESA (ESA in 70% aqueous solution) | 1 and 1/(1:1) | 28.0 | 97.0 |
| 11 | DBU/ESA (ESA in 70% aqueous solution) | 1 and 1.2/(1:1) | 28.0 | 96.2 |
| 12 | TMHD/TSA | 1.2 and 1.32/(1:1) | 47.6 | 90.1 |
| 13 | TMHD/TSA | 1.2 and 1.72/(1:1.3) | 43.6 | 95.5 |
| 14 | TMHD/TSA | 1.2 and 2.12/(1:1.6) | 36.3 | 92.7 |
| 15 | TMHD/TSA | 1.2 and 2.38/(1:1.8) | 34.1 | 92.2 |
| 16 | TMHD/TSA | 1.2 and 2.64/(1:2) | 23.0 | 90.8 |
| 17 | TMBD/TSA | 1 and 1.3/(1:1) | 29.1 | 97.1 |
| 18 | TMBD/TSA | 1 and 1.7/(1:1.3) | 29.2 | 96.8 |
| 19 | TMBD/TSA | 1 and 2.1/(1:1.6) | 26.0 | 95.7 |
| 20 | TMBD/TSA | 1 and 2.37/(1:1.8) | 20.0 | 96.7 |
| 21 | TMBD/CSA | 1 and 1.6/(1:1) | 24.5 | 97.5 |
| 22 | TMBD/CSA | 1 and 3.2/(1:2) | 19.8 | 95.3 |
| 23 | TMGU/TSA | 1 and 1.6/(1:1) | 25.4 | 93.3 |
| 24 | TMGU/TSA | 1 and 3.2/(1:2) | 15.1 | 96.1 |
| 25 | TMGU/CSA | 1 and 2.0/(1:1) | 26.7 | 97.6 |
| COMP. A | No amine/no acid | 0 | 15–18 | 96–98 |

As can be seen from the above data (compare, for example, Examples 5, 12, 21 and 23 to Examples 6, 16, 22 and 24, respectively), polyamide membranes made in the presence of salt-containing compounds having both a tertiary amine salt functional group and a tertiary amine functional group exhibit higher flux than comparable polyamide membranes made in the presence of salt-containing compounds having a plurality of tertiary amine salt functional groups and no tertiary amine functional groups. Moreover, as can be seen, for example, from Examples 12 through 16 and 17 through 20, as the molar ratio of poly- 4. The polyamide membrane as claimed in claim 1 wherein said compound has at least two tertiary amine salt functional groups.

5. The polyamide membrane as claimed in claim 1 wherein said compound is a reaction product of a strong acid and a polyfunctional tertiary amine.

6. The polyamide membrane as claimed in claim 5 wherein said strong acid is selected from the group consisting of an aromatic sulfonic acid, an aliphatic sulfonic acid, a cycloaliphatic sulfonic acid, trifluoroacetic acid, nitric acid, hydrochloric acid, sulfuric acid and mixtures thereof.

7. The polyamide membrane as claimed in claim 6 wherein said strong acid is selected from the group consisting of methanesulfonic acid, toluenesulfonic acid, camphorsulfonic acid, ethanesulfonic acid and benzenesulfonic acid.

8. The polyamide membrane as claimed in claim 5 wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0] non-5-ene; 1,4-dimethylpiperazine; 4-[2-(dimethylamino) ethyl]morpholine; N,N,N',N',-tetramethylethylenediamine; N,N,N',', -tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; N,N,N',N',N",-pentamethyldiethylenetriamine; and mixtures thereof.

9. The polyamide membrane as claimed in claim 8 wherein said polyfunctional tertiary amine is selected from the group consisting of 1,4-diazabicyclo[2,2,2]octane; 1,8-diazabicyclo[5,4,0]undec-7-ene; N,N,N',N',-tetramethyl-1,6-hexanediamine; N,N,N',N',-tetramethyl-1,3-butanediamine; and 1,1,3,3-tetramethylguanidine.

10. The polyamide membrane as claimed in claim 1 wherein said polyfunctional amine is at least one member selected from the group consisting of an aromatic primary diamine and substituted derivatives thereof, an alkane primary diamine, a cycloaliphatic primary diamine, a cycloaliphatic secondary diamine, an aromatic secondary diamine and a xylylene diamine.

11. The polyamide membrane as claimed in claim 10 wherein said polyfunctional amine is meta-phenylenediamine.

12. The polyamide membrane as claimed in claim 1 wherein said amine-reactive reactant is at least one member selected from the group consisting of an isophthaloyl halide, a terephthaloyl halide and a trimesoyl halide.

13. The polyamide membrane as claimed in claim 12 wherein said amine-reactive reactant is a trimesoyl halide.

14. The polyamide membrane as claimed in claim 13 wherein said amine-reactive reactant is trimesoyl chloride.

15. A composite reverse osmosis membrane comprising:
(a) a porous support; and
(b) a polyamide layer as claimed in claim 1 on said porous support.

16. The composite reverse osmosis membrane as claimed in claim 15 wherein said at least one amine salt functional group is at least one tertiary amine salt functional group and wherein said at least one amine functional group is at least one tertiary amine functional group.

17. The composite reverse osmosis membrane as claimed in claim 16 wherein said porous support is made of a material selected from the group consisting of polysulfone, a polyether sulfone, a polyimide, a polyamide, polypropylene and polyvinylidene fluoride.

18. The composite reverse osmosis membrane as claimed in claim 16 wherein said compound is a reaction product of a strong acid and a polyfunctional tertiary amine.

19. A polyamide membrane comprising a reaction product of (i) a polyfunctional amine and (ii) an amine-reactive reactant selected from the group consisting of a polyfunctional acyl halide, a polyfunctional sulfonyl halide and a polyfunctional isocyanate (iii) in the presence of a salt-containing compound, said salt-containing compound being a reaction product of a strong acid and a polyfunctional tertiary amine.

20. The polyamide membrane as claimed in claim 19 wherein said polyfunctional tertiary amine has n tertiary amine functional groups, n being greater than or equal to 2, and wherein said polyfunctional tertiary amine and said strong acid are reacted together in a molar ratio that is greater than or equal to 1:1, respectively, and is less than 1:n, respectively.

21. The polyamide membrane as claimed in claim 20 wherein said polyfunctional tertiary amine and said strong acid are reacted together in a molar ratio that is less than 1:(0.95)n, respectively.

22. The polyamide membrane as claimed in claim 20 wherein said polyfunctional tertiary amine and said strong acid are reacted together in a molar ratio that is less than 1:(0.9)n, respectively.

23. The polyamide membrane as claimed in claim 22 wherein said polyfunctional tertiary amine has exactly 2 tertiary amine functional groups.

24. The polyamide membrane as claimed in claim 23 wherein said polyfunctional tertiary amine and said strong acid are reacted together in a 1:1 molar ratio.

25. The polyamide membrane as claimed in claim 20 wherein said polyfunctional tertiary amine and said strong acid are reacted together in a 1:1 molar ratio.

26. The polyamide membrane as claimed in claim 19 wherein said polyfunctional tertiary amine has m tertiary amine functional groups, m being greater than or equal to 3, and wherein said polyfunctional tertiary amine and said strong acid are reacted together in a molar ratio that is greater than or equal to 1:1, respectively, and is less than or equal to 1:(m−1), respectively.

27. The polyamide membrane as claimed in claim 19 wherein said strong acid is selected from the group consisting of an aromatic sulfonic acid, an aliphatic sulfonic acid, a cycloaliphatic sulfonic acid, trifluoroacetic acid, nitric acid, hydrochloric acid, sulfuric acid and mixtures thereof.

28. The polyamide membrane as claimed in claim 27 wherein said strong acid is selected from the group consisting of methanesulfonic acid, toluenesulfonic acid, camphorsulfonic acid, ethanesulfonic acid and benzenesulfonic acid.

29. The polyamide membrane as claimed in claim 19 wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0] non-5-ene; 1,4-dimethylpiperazine; 4-[2-(dimethylamino) ethyl]morpholine; N,N,N',N',-tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; N,N,N',N',N",-pentamethyldiethylenetriamine; and mixtures thereof.

30. The polyamide membrane as claimed in claim 19 wherein said strong acid is selected from the group consisting of methanesulfonic acid, toluenesulfonic acid, camphorsulfonic acid, ethanesulfonic acid and benzenesulfonic acid and wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0]non-5-ene; 1,4-dimethylpiperazine; 4-[2-(dimethylamino) ethyl]morpholine; N,N,N',N',-tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; and N,N,N',N',N",-pentamethyldiethylenetriamine.

31. A composite reverse osmosis membrane comprising:
(a) a porous support; and
(b) a polyamide layer as claimed in claim 19 on said porous support.

32. A polyamide membrane comprising a reaction product of (i) an aqueous solution comprising a polyfunctional amine and a salt-containing compound, said salt-containing compound comprising at least one tertiary amine salt functional group and at least one tertiary amine functional group and (ii) an organic solvent solution comprising an amine-reactive reactant selected from the group consisting of a polyfunctional acyl halide, a polyfunctional sulfonyl halide and a polyfunctional isocyanate.

33. The polyamide membrane as claimed in claim 32 wherein said salt-containing compound is present in said aqueous solution in an amount constituting about 0.1 to 12%, by weight, of said aqueous solution.

34. The polyamide membrane as claimed in claim 32 wherein said polyfunctional amine is present in said aqueous solution in an amount constituting about 0.1 to 20%, by weight, of said aqueous solution.

35. The polyamide membrane as claimed in claim 32 wherein said amine-reactive reactant is a polyfunctional acyl halide present in said organic solvent solution in an amount constituting about 0.01 to 10%, by weight, of said organic solvent solution.

36. A composite reverse osmosis membrane comprising:
    (a) a porous support; and
    (b) a polyamide layer as claimed in claim 33 on said porous support.

37. A method of making a composite reverse osmosis membrane, said method comprising the steps of:
    (a) coating a porous support with an aqueous solution comprising a polyfunctional amine and a salt-containing compound, said salt-containing compound being a reaction product of a strong acid and a polyfunctional tertiary amine, so as to form a liquid layer on said porous support;
    (b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
    (c) drying the product of step (b) to form a composite reverse osmosis membrane.

38. The method as claimed in claim 37 wherein said polyfunctional tertiary amine has n tertiary amine functional groups, n being greater than or equal to 2, and wherein said polyfunctional tertiary amine and said strong acid are reacted together in a molar ratio that is greater than or equal to 1:1, respectively, and is less than 1:n, respectively.

39. The method as claimed in claim 38 wherein said polyfunctional tertiary amine and said strong acid are reacted together in a molar ratio that is less than 1:(0.95)n, respectively.

40. The method as claimed in claim 38 wherein said polyfunctional tertiary amine and said strong acid are reacted together in a molar ratio that is less than 1:(0.9)n, respectively.

41. The method as claimed in claim 40 wherein said polyfunctional tertiary amine has exactly 2 tertiary amine functional groups.

42. The method as claimed in claim 41 wherein said polyfunctional tertiary amine and said strong acid are reacted together in a 1:1 molar ratio.

43. The method as claimed in claim 38 wherein said polyfunctional tertiary amine and said strong acid are reacted together in a 1:1 molar ratio.

44. The method as claimed in claim 37 wherein said polyfunctional tertiary amine has m tertiary amine functional groups, m being greater than or equal to 3, and wherein said polyfunctional tertiary amine and said strong acid are reacted together in a molar ratio that is greater than or equal to 1:1, respectively, and is less than or equal to 1:(m−1), respectively.

45. The method as claimed in claim 37 wherein said strong acid is selected from the group consisting of an aromatic sulfonic acid, an aliphatic sulfonic acid, a cycloaliphatic sulfonic acid, trifluoroacetic acid, nitric acid, hydrochloric acid, sulfuric acid and mixtures thereof.

46. The method as claimed in claim 45 wherein said strong acid is selected from the group consisting of methanesulfonic acid, toluenesulfonic acid, camphorsulfonic acid, ethanesulfonic acid and benzenesulfonic acid.

47. The method as claimed in claim 37 wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0]non-5-ene; 1,4-dimethylpiperazine; 4-[2-(dimethylamino)ethyl]morpholine; N,N,N',N',-tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; N,N,N',N',N",-pentamethyldiethylenetriamine; and mixtures thereof.

48. The method as claimed in claim 37 wherein said strong acid is selected from the group consisting of methanesulfonic acid, toluenesulfonic acid, camphorsulfonic acid, ethanesulfonic acid and benzenesulfonic acid and wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0]non-5-ene; 1,4-dimethylpiperazine; 4-[2-(dimethylamino)ethyl]morpholine; N,N,N',N',-tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; and N,N,N',N',N",-pentamethyldiethylenetriamine.

49. The method as claimed in claim 38 wherein said strong acid is toluenesulfonic acid and wherein said polyfunctional tertiary amine is N,N,N',N',-tetramethyl-1,6-hexanediamine.

50. The method as claimed in claim 37 wherein said drying step comprises heating the product of step (b) at a temperature from about 50° C. to 130° C.

51. The method as claimed in claim 37 further comprising the step of rinsing the product of step (c) in a basic aqueous solution.

52. A method of making a composite reverse osmosis membrane, said method comprising the steps of:
    (a) combining a polyfunctional amine, a polyfunctional tertiary amine, a strong acid and an aqueous solvent to form an aqueous solution;
    (b) coating a porous support with the aqueous solution of step (a) so as to form a liquid layer on said porous support;
    (c) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
    (d) drying the product of step (c) to form a composite reverse osmosis membrane.

53. The method as claimed in claim 52 wherein said polyfunctional tertiary amine has n tertiary amine functional groups, n being greater than or equal to 2, and wherein said polyfunctional tertiary amine and said strong acid are added together in a molar ratio that is greater than or equal to 1:1, respectively, and is less than 1:n, respectively.

54. The method as claimed in claim 53 wherein said polyfunctional tertiary amine and said strong acid are added together in a molar ratio that is less than 1:(0.95)n, respectively.

55. The method as claimed in claim 54 wherein said polyfunctional tertiary amine and said strong acid are added together in a molar ratio that is less than 1:(0.9)n, respectively.

56. The method as claimed in claim 55 wherein said polyfunctional tertiary amine and said strong acid are reacted together in a 1:1 molar ratio.

57. The method as claimed in claim 53 wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0]non-5-ene; 1,4-dimethylpiperazine; 4-[2-(dimethylamino)ethyl]morpholine; N,N,N',N',-tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; N,N,N',N',N",-pentamethyldiethylenetriamine; and mixtures thereof.

58. The method as claimed in claim 53 wherein said strong acid is selected from the group consisting of methanesulfonic acid, toluenesulfonic acid, camphorsulfonic acid, ethanesulfonic acid and benzenesulfonic acid and wherein said polyfunctional tertiary amine is selected from the group consisting of 1,4-diazabicyclo[2,2,2]octane; 1,8-diazabicyclo[5,4,0]undec-7-ene; 1,5-diazabicyclo[4,3,0]non-5-ene; 1,4-dimethylpiperazine; 4-[2-(dimethylamino)ethyl]morpholine; N,N,N',N',-tetramethylethylenediamine; N,N,N',N',-tetramethyl-1,3-butanediamine; N,N,N',N',-tetramethyl-1,4-butanediamine; N,N,N',N',-tetramethyl-1,3-propanediamine; N,N,N',N',-tetramethyl-1,6-hexanediamine; 1,1,3,3-tetramethylguanidine; and N,N,N',N',N",-pentamethyldiethylenetriamine.

* * * * *